Figure 1:
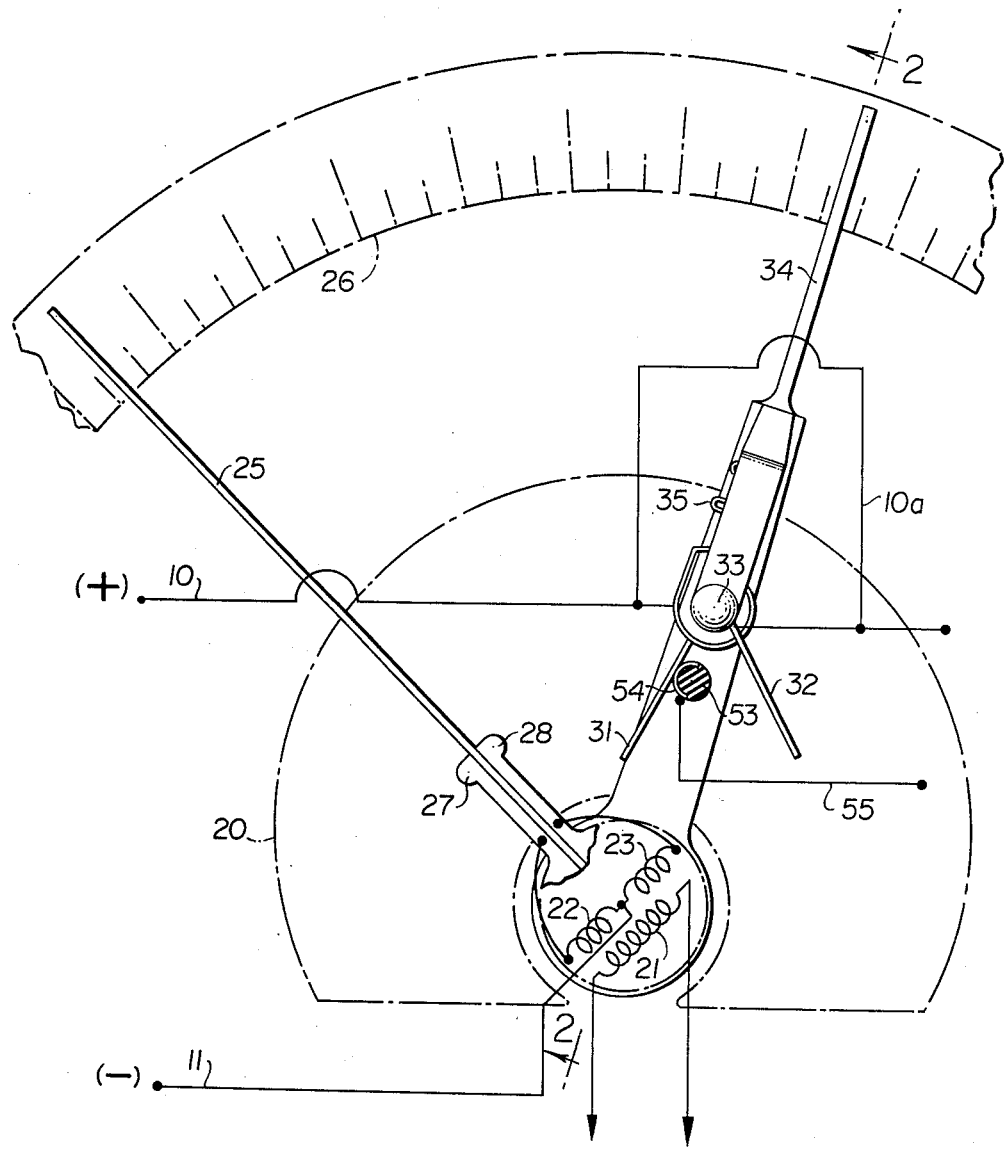

INVENTORS
GEORGE J. CROWDES
GEORGE E. HAMMOND
BY
Richard H. MacCutcheon, Atty.

INVENTORS
GEORGE J. CROWDES
GEORGE E. HAMMOND
BY
Richard H. MacCutcheon, Atty.

United States Patent Office 3,157,755
Patented Nov. 17, 1964

3,157,755
METER RELAY HAVING THROWABLE CONTACTS AND AN ADDITIONAL CONTACT IN THE REGION OF A CENTER POST STOP
George E. Hammond, Willoughby, and George J. Crowdes, Chesterland, Ohio, assignors to Assembly Products, Inc., Chesterland, Ohio, a corporation of Ohio
Filed May 10, 1961, Ser. No. 109,211
3 Claims. (Cl. 200—56)

The present invention relates to meter relays and has particular significance in connection with mechanical arrangements for forming electrical circuits for galvanometer type meter relays provided with contacts.

Heretofore, it has been known to have a moving coil instrument with the coil rotating within or about a permanent magnet to rotate a pointer thereby operating contacts for making an electrical circuit when a predetermined coil position is reached. One or more booster coils, for the purpose of increasing the pressure between the contacts when they meet, has been found useful as explained in many patents of the prior art. In some instances in the past it has been known to have one or more relatively stationary contacts "thrown" out of the way of operation of a movable pointer, after initial mating, and an example of this is shown in co-pending patent application S.N. 833,274, now Patent No. 3,121,190 filed August 12, 1959, in the names of Crowdes, Hausdorf and Hammond, and assigned to the assignee of the present invention. In accordance with the disclosure and claims of that patent application, and as again described herein, for either limit of travel a "throwable" contact is thrown out of the way to permit the signal coil of the meter to move freely in the scale range above or below an adjusted position of the throwable contacts. But that patent application introduced certain complexities by way of requisite associate apparatus, as well as maintenance difficulties and slow response characteristics due to the necessity of providing, for either direction of travel, two values of locking coil current, one for initial mating, and the other to throw the associate relatively stationary contact out of the way.

In co-pending patent application of Saint-Amour and Quittner, S.N. 83,335, now Patent No. 3,121,191, filed January 17, 1961, and assigned to the assignee of the present invention, the use of an external and biased load relay was suggested for the purpose of eliminating some of the complexities but the use of external relays introduces an extra factor of cost and space and additional moving parts.

A limitation in the use of continuous reading meter relays has been the tendency, where the set pointer is near the end of the dial scale, for the signal pointer, following a toggling action toward the close end of the scale, to have acquired so much momentum that when said signal pointer encounters the pointer stop resiliently, it bounces back far enough for its contact to touch the toggle contact. Because of the locking coil arrangements, the signal pointer immediately toggles toward the center of the scale. Because the electrical signal may not have changed, the signal pointer now returns and toggles through toward the close end of the dial scale, starting a new regenerative cycle.

It is an object of the present invention to provide simple means for overcoming the above mentioned difficulties.

A further object of the invention is to provide an electromechanical arrangement for handling load currents in a meter relay per se while still providing an unimpeded view of scale or face plate used in connection with such meter to show at all times both the signal value and the position which has been preselected for contact operation.

Figure 2:
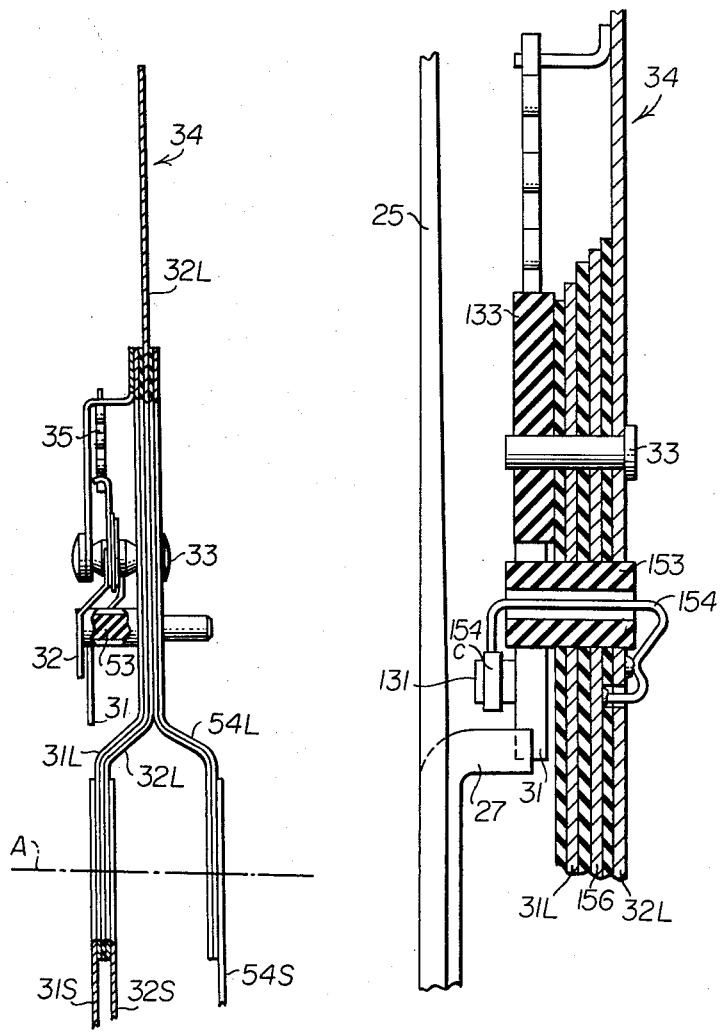
Figure 3:
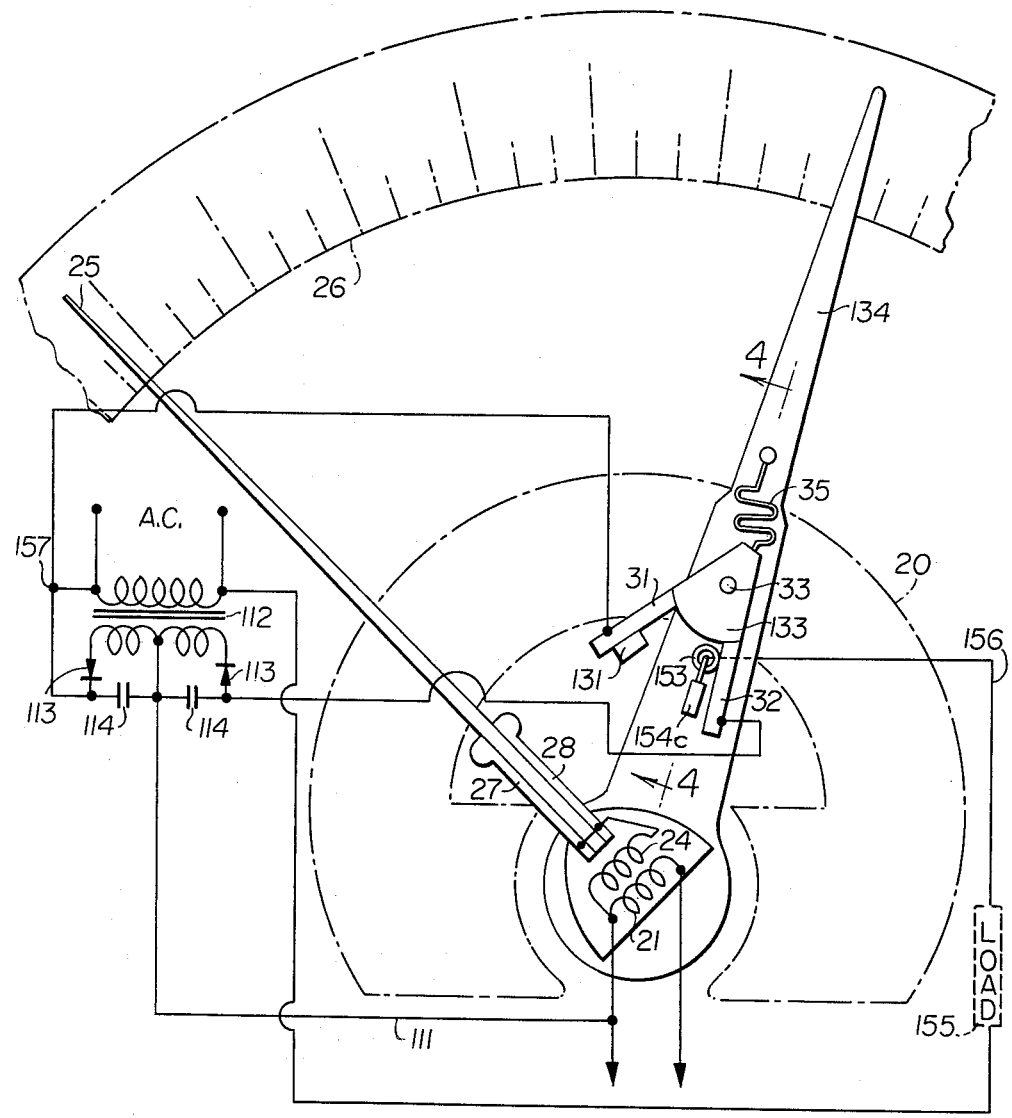

Other objects and advantages will become apparent and the invention may be better understood from consideration of the following description taken in connection with the accompanying drawing, in which:

FIG. 1 is a diagrammatical illustration of an electrical meter relay constructed according to the present invention;
FIG. 2 is a cross sectional view of the stop post 53 of FIG. 1 and of the associate adjustable pointer 34;
FIG. 3 shows a modification;
FIG. 4 is a sectional view of stop post 153 and associate pointer 134 of FIG. 3.

Referring to FIG. 1, lines 10 and 11 may be assumed connected to a D.C. source of 150 volt power. A contact meter is assumed provided with a permanent magnet 20 reactive to which a sensitive coil indicated diagrammatically at 21 turns responsive to changes in a minute quantity of sensitive coil current introduced from a signal source (not shown). Mounted to rotate with coil 21 are locking coils 22, 23 which provide, one for one direction and the other for the other direction of travel, an additional boosting and locking torque which also serves to "throw" relatively stationary contacts about to be described. For indicating, a pointer 25 cooperates with a suitable marked scale plate 26. As illustrated, contact portions 27–28 of pointer 25 are used to mate with relatively stationary contacts at desired and adjustable points of travel, to cause additional locking torque to aid sensitive coil torque at the time of contact mating which torque further serves to interrupt the circuits and to complete or open another circuit (depending on direction of throw as hereinafter explained) while allowing readings of the signal pointer 25 outside of the limits of the respective stationary contacts.

As in the above mentioned co-pending applications, the relatively stationary contact means may be two "throwable" contacts. These contacts, 31, 32 in FIG. 1, may be mutually insulated one from the other (although this is not necessary for the circuit as shown in FIG. 1) but they are mounted to be mechanically movable together around a single pivot 33 while mounted on a manually adjustable set pointer 34. The movement of contacts 31, 32 is in part restrained by a spring 35, whose complete shape and function is most clearly shown in FIG. 3, operating to rotate the contact assembly one way or the other (once the motion is started by pointer contact 28 or 27) against a stop post located between them. In accordance with the present invention the stop post, or a part associated with it, is itself used as a load contact and in the arrangement shown in FIG. 1 this stop post is predominately of insulating material 53 but presents to just one of the relatively stationary contacts (as shown to contact 31) a conductive material portion 54.

As a practical matter there need not be any movable wires 10 (to 31), 10a (to 32) or 55 (from stop post to controlled load) because as shown in FIG. 2, which is an enlarged view along the line 2—2 of FIG. 1, and as explained in the co-pending application S.N. 833,274, the adjustable set pointer (34) can be built up of alternate conductive and insulating laminations so that conductive laminations 31L, 32L can serve to carry current to and from relatively stationary contacts 31S and 32S adjacent the meter movement axis "A" in a very effective manner while, to accommodate the present invention, an additional conductive lamination 54L may serve to carry current to and from the stop post conductive portion 54 to a stationary wiper lamination 54S.

For the electrical arrangement in FIG. 1, where contacts 31, 32 are always at the same potential, the contacts could have a common mounting member of conductive material, but a more universal arrangement takes care of other wiring (see FIG. 3) and both the pivot 33 and the pointer 34 are preferably built up of alternate conductive and insulating laminations as in FIG. 2 and as in the co-pending application S.N. 833,274.

In FIG. 3 like parts are like numbered as in FIG. 1 but only a single locking coil 24 is used to provide locking (and "throwing") torque for either direction of travel by, as is more or less conventional, connecting one end of the locking coil to both of the pointer contact portions 27, 28 while the opposite end of the locking coil is connected for convenience to one end of the coil 21 and via a lead 111 to the center tap of a three wire source of voltage supply which in the illustrated embodiment includes an A.C. input to a transformer 112 having a center tap secondary and associate apparatus such as rectifiers 113 and condensers 114 for providing opposite polarity voltages on the relatively stationary contacts 31 and 32, respectively.

As before, the throwable contacts 31, 32 are "toggled" one way or the other by action of the sensitive pointer contacts cooperating with a spring 35 but in FIG. 3 (and 4) the stop post for the throwable contacts is a hollow cylinder of insulating material 153. Again, as is important, there is an unimpeded view of the meter face, again the center stop or a major portion of it is an insulated member, but in FIG. 3 (and 4) the hollow stop 153, which may be of plastic, contains a torsion axle 154 supporting a contact portion 154c, the torsion axle 154 (see FIG. 4) serving to conduct current to and from contact 154c and also, by reason of its resilience, to provide a wiping action for contact 154c with respect to a contact portion 131 which is carried by and in circuit with contact 31. The various operating planes are so selected that in any event the center contact (54 in FIG. 1 or 154c in FIG. 3 or 4) does not electrically contact or mechanically interfere with the pointer mounted contacts 27 and 28.

In FIG. 3 a circuit is completed through a controlled load, indicated generally at 155, by a lead 156 which may be a wire (though preferably a lamination) on the assembly of the adjustable pointer 134 and connected to the torsion axle 154 and thus in circuit with the contact 154c.

It should be noted that with arrangements according to the invention the contact "within the V" becomes an independent one which is not in the D.C. circuit (in either FIG. 1 or 3) so that the controlled circuit can be independent of the torque amplifying circuit (even though one D.C. lead may be common with one side of A.C. as shown at 157 in FIG. 3).

For an arrangement as in FIG. 3, where 31 and 32 are constantly at different potential, a common mounting member 133 may be built up of alternate conductive and insulating laminations (as in the co-pending application S.N. 833,274) or it and the pivot 33 can be of insulating material with wires (not shown) carried internally for the purpose of taking currents to and from the mutually insulated laminations 31L and 32L which together with the added conductive lamination 156 (for taking current to and from the torsion rod contact 154) may make up the set pointer 34. At or near the pivot point of the pointer 34 additional mutually insulated laminations (see FIG. 2) may be stationary and by wiping action over large effective areas of contact take current to and from the laminations 31L, 32L and 156 of the adjustable set pointer 34.

Operation is only in certain respects the same as described in the co-pending applications for there is the distinctive and simplifying difference and improvement that associate apparatus is not required in order to handle load currents as high as 1 amp and voltages as high as 300 volts. Two values of locking current (one to complete load circuits and the other to throw the toggle) are no longer necessary, and the load circuit is completed at the end of toggling rather than at the beginning. The advantage of readability of both pointers and the great advantage of readability of the sensitive pointer outside of the limits set by the adjustable pointer are still maintained and yet the load contact is built right into the meter relay apparatus eliminating the disadvantages of external relays, and providing more adaptability to miniaturization, without adding to the inertia of the main movable assembly as is extremely important.

The customary original adjustment of set pointer stops for two-value relay circuitry was within the range of 15% to 85% of scale range. Refinements in adjustment techniques made possible a standard commercial adjustment of 10% to 90% of scale range. With auxiliary load relays, the amount of work performed by toggling current is determined by the sum of the work required to accelerate the signal pointer and throw the toggle, and to move the load relay armature. By eliminating the part of the work required to move the armature of a load relay, only the watt-seconds necessary to move the signal pointer and throw the toggle need be passed through the locking coil, which means a substantial reduction in toggling watt-seconds. This permits either a greater range of set pointer adjustment, or reduced difficulty in commercially adjusting meter relays for 10% to 90% set pointer range, without initiating the regenerative bouncing described above.

By completing load circuits inside an inner toggle stop, as contradistinguished from some prior arrangements where they were completed outside of toggle arms, the electrical complexities of the above mentioned co-pending patent applications and mechanical complexities of arrangements according to various issued patents have been obviated and the circuitry greatly simplified. Further, arrangements according to the present invention have the advantage of assuring that outside apparatus (load) will never operate out-of-step with respect to the toggle (e.g., regardless of position of movable members at time of a start up after de-energization) and the outside apparatus power source may be of any desired voltage and frequency.

Of extreme interest is the fact that we have provided a very high gain non-linear amplifier which, because of the toggle, automatically turns itself on and automatically turns itself off. Because a stop post is used in connection with the means for handling load current, the device is capable of large output (as large as 1 ampere of current) while, because of all the features taken together, there need be very little operative drop in the signal circuit (which need be only $\frac{1}{10}$ ohm total impedance). Thus, for example a signal of $10 \times 10^{-6}$ amperes at $5 \times 10^{-3}$ volts, or $5 \times 10^{-10}$ watts, might control a 100 volt 1 ampere circuit, or 100 watts; this is a power ratio of $$\frac{10^2}{5 \times 10^{-10}}$$

or $=2 \times 10^{11}$. Thus the device is operative in a very narrow band of control (will turn on and off with unusually small changes of signal) and will outperform conventional relays, vacuum tubes and transistors, while it will apparently need no maintenance even after years, and millions of operations.

In accordance with one aspect of the present invention a load circuit is completed when at least one relatively stationary but adjustable and also throwable contact pivots around and hits a center post stop. To this end the center post may be partly or completely insulated so that only one of two toggle arms is so operative or it may be a conductive member (e.g., when both throwable contacts can be in the same external circuit), or it might be insulated and provided with oppositely facing buttons, for while we have illustrated and described particular embodiments, various modifications may obviously be made without departing from the true spirit and scope of the invention which is intended to be defined only by the accompanying claims taken with all reasonable equivalents.

We claim:

1. In an electrical meter of the type having a signal coil rotatable by reaction with a magnet, having a reference scale, having a signal coil position indicator cooperative with said reference scale for viewing, having a control contact carried by said signal coil position indicator, having a throwable control contact which is pivotally mounted so that it may assume a first position at which it is arranged to mate with the control contact carried by the signal indicator and may assume a second or thrown position in which it is not engageable by the control contact carried by the signal indicator, having means for assuring movement of said throwable control contact from its first to its second position when such movement is initiated by the indicator control contact, means including a second throwable contact mechanically associated with the first throwable contact for returning the first throwable contact from second to first position, having an adjustable set pointer on which both throwable contacts are mounted and which adjustable pointer is cooperative for viewing with said reference scale to indicate the adjusted position at which throwable contact actuation may take place, the novel combination of a center post stop located on said adjustable set pointer arranged between the throwable contacts and for stopping the motion of the assembly of throwable contacts as either of said contacts hits the stop when driven by motion of the other, an additional contact in the region of the center post stop and for mating with at least a portion of at least one of the throwable contacts, and means including connections from said one of the throwable contacts and from said additional contact to complete a circuit through a load upon the mating of said last mentioned contacts.

2. The combination as in claim 1 further characterized by the stop being predominantly of insulating material while having an arcuate face of conductive material.

3. In a meter relay of the type having coil means, and having a magnetic field within which said coil means is rotatable, and having contact means rotatable with the coil means and electrically connected to the coil means, and having a cooperating relatively fixed while throwable contact which has a first operative position in which it is engageable by the rotatable contact means but into which it is movable from the first position by reason of the torque exerted by the coil means so as to open the switch formed by the two contacts and allow the coil means substantial further freedom of movement, said meter relay further being of the type having a stop means for the throwable contact, and having an additional relatively stationary contact mounted in the region of said stop and arranged to engage said throwable contact, the novel combination of said stop being a hollow cylindrical insulating member having a conductive material torsion rod extending through at least a portion of said bore with the last mentioned relatively stationary contact mounted in the region of the stop being mounted on an end of said torsion rod and thus arranged to engage the throwable contact, whereby the torsion rod provides a wiping action between relatively stationary contacts which are thus mechanically isolated from any effect between the throwable contact and the contact means rotatable with the coil means.

References Cited in the file of this patent

UNITED STATES PATENTS

| | | |
|---|---|---|
| 2,042,109 | Lamb | May 26, 1936 |
| 2,109,872 | Uehling | Mar. 1, 1938 |
| 2,780,709 | Thompson et al. | Feb. 5, 1957 |

FOREIGN PATENTS

| | | |
|---|---|---|
| 555,341 | Belgium | Mar. 15, 1957 |